United States Patent

Roche

[11] Patent Number: 5,289,595
[45] Date of Patent: Mar. 1, 1994

[54] DRY-OPERATED ROTARY COMPOSTING TOILET

[75] Inventor: Jean-Louis Roche, Saint-Privat, France

[73] Assignee: Centre d'Experimentation et de Documentation sur les Energies Renouvelables, Nyons, France

[21] Appl. No.: 857,933
[22] PCT Filed: Sep. 16, 1991
[86] PCT No.: PCT/FR91/00728
   § 371 Date: May 19, 1992
   § 102(e) Date: May 19, 1992
[87] PCT Pub. No.: WO92/04851
   PCT Pub. Date: Apr. 2, 1992

[30] Foreign Application Priority Data

Sep. 16, 1990 [FR] France .................. 90 11774

[51] Int. Cl.⁵ .................................. A47K 11/02
[52] U.S. Cl. ................................. 4/449; 4/479; 4/DIG. 12; 4/DIG. 19
[58] Field of Search .............. 4/DIG. 12, DIG. 19, 4/449, 459, 474, 479; 435/312, 315; 422/184

[56] References Cited

U.S. PATENT DOCUMENTS

| | | | |
|---|---|---|---|
| 3,054,663 | 9/1962 | Komline | 4/DIG. 12 |
| 3,923,605 | 12/1975 | Gedde | 195/142 |
| 4,223,094 | 9/1980 | Vaseen | 435/312 |
| 4,364,130 | 12/1982 | Persson | 4/449 |
| 4,633,535 | 1/1987 | Louvo | 4/449 |

FOREIGN PATENT DOCUMENTS

| | | | |
|---|---|---|---|
| 1054307 | 5/1979 | Canada | 4/DIG. 12 |
| 2347194 | 3/1974 | Fed. Rep. of Germany | 4/449 |
| 9001473 | 2/1990 | PCT Int'l Appl. | 422/184 |
| 09819 | 7/1991 | PCT Int'l Appl. | 4/449 |

Primary Examiner—Henry J. Recla
Assistant Examiner—Charles R. Eloshway
Attorney, Agent, or Firm—Bacon & Thomas

[57] ABSTRACT

A composting toilet includes a tank (1) that is mounted so as to be inclined and rotatable about its longitudinal axis of symmetry (x-x'), which axis forms with the horizontal plane an angle ($\alpha$) at least equal to 15°. The toilet includes a seat (22) having an associated discharge hole (23). The entire discharge hole (23) is located directly vertically above a receiving orifice (6) of the tank.

10 Claims, 3 Drawing Sheets

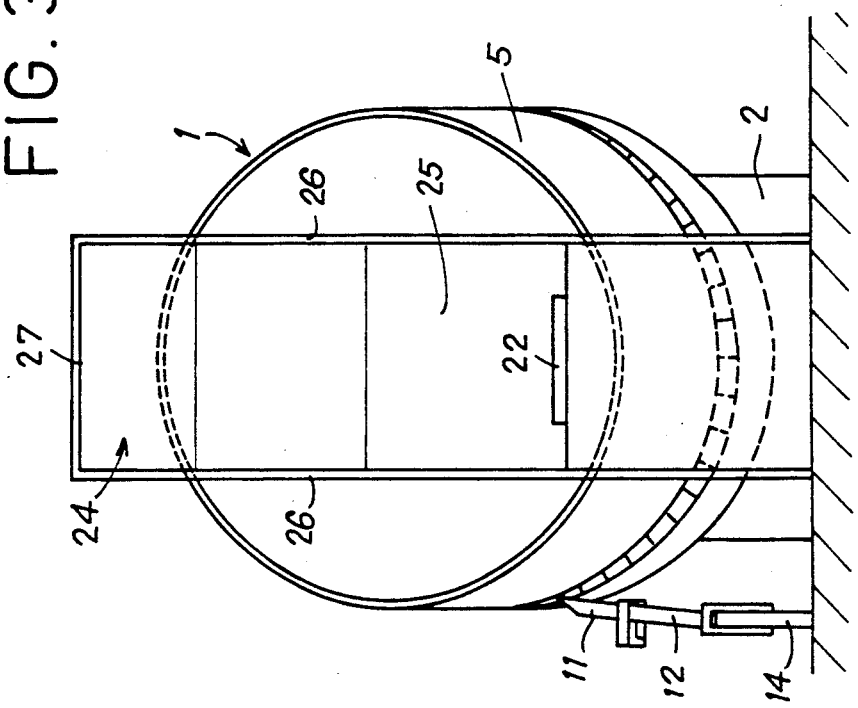
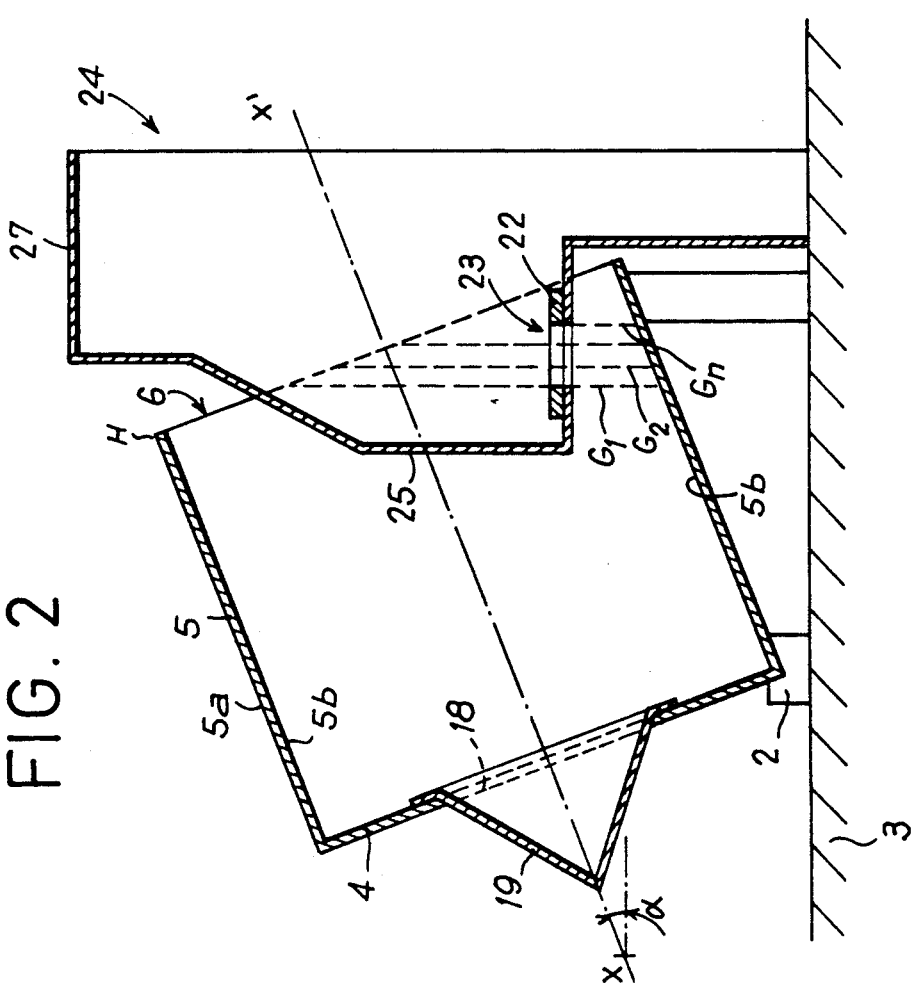

DRY-OPERATED ROTARY COMPOSTING TOILET

TECHNICAL FIELD

The present invention relates to the general technical field of devices for drainage and transformation of human excreta and urine. The invention relates more particularly to devices of the aforesaid type working in dry conditions, namely those which are not intended to be coupled or connected to a general disposal system using a generally aqueous carrying fluid or liquid.

In industrially developed countries, it is normal to use water as evacuation means and optionally as a draining medium in drainage techniques. However, in certain cases, there is no water system available, which makes this technique impossible to use. In addition, even if the connection with a water drainage system is technically possible, the disposal of human wastes may prove to be an important source of pollution, when the ground has a very low purifying power or simply when it remains frozen for a very large part of the year. In such cases, it is then necessary to call on other drainage techniques, such as for example techniques of chemical stabilization, electrical drying or static composting.

The present invention comes under the category of composting toilets ensuring a composting of the human faeces, without the addition of any drainage fluid, thereby permitting to overcome the absence of any possibility of connection of the system with a general water drainage system.

PRIOR ART

Recently, and besides the solutions of electrical combustion or chemical degradation, attempts have been made to improve the decomposition of excreta by speeding up and controlling aerobic digestion. Various types of composting toilets have thus been proposed and for example, patent GB-A-1 580 659 describes a device comprising a toilet seat combined with a composting compartment and a reserve of water. The device also comprises a system of pipes and subsidiary pumping compartments connecting the composting tank proper, which is equipped with frother means, with one or more additional compartments for receiving the dejections. The design of such a device results in a unit of large overall dimensions, due to the succession of tanks, and which requires the presence of an additional tank of water. Moreover, the internal arrangement of this device is such that there are, along the containers and the pipes, a large number of zones and surfaces which the evacuation liquid cannot reach, this resulting, on the one hand, in a heterogeneity of the aerobic digestion, and on the other hand, in the release of unpleasant smells. Such a device also requires the presence of a subsidiary water tank, needing constant filling up and maintenance. It should also be noted that in certain regions, and in particular in regions where water is scarce or difficult to reach, the necessity to use a evacuation fluid represents a great disadvantage. Finally, the use of a static composting tank, merely equipped with frother means, improves to a certain extent the composting speed which, nonetheless, remains relatively slow.

A biological toilet is also known from PCT application 81-03 487, which toilet is equipped with a toilet seat placed over a composting container provided with stirring means constituted of an endless screw. The toilet is completed with a humidifying unit which includes a reservoir of water and with heating elements designed to increase the temperature inside the composting container. Such a device presents various disadvantages and, in particular, it is rather unsightly insofar as the seat is disposed just above the receiving container which acts as composting container. Moreover, despite the presence of a microprocessor whose function is to control stirring, moistening and heating, the aerobic digestion takes a relatively long time because of the absence of separation between the solid and liquid phases, which inevitably causes the release of smells. Similarly to the device described in the preceding paragraph, such a device also requires the presence of a subsidiary reservoir of liquid.

Finally, a biological toilet is described in Canadian Patent CA-A-10 54 307, comprising a toilet seat placed on top of a receiving unit constituted of four tanks mounted so as to be inclined with respect to a common axis and rotatable about said axis. The receiving tanks are situated outside the discharge hole of the toilet and an associated deviation device constituted by a mobile flap, located below the seat, is provided so as, on the one hand, to ensure separation of the liquid and solid phases and, on the other hand, to direct the dry matter towards the receiving tanks serving as composting tanks. Such a device also has one disadvantage which is linked to its overall size and to the presence of a deviation device which it has been found impossible to keep in totally hygienic conditions, and of which the position just below the seat makes it impossible to ensure a clean visual presentation of the toilet. It should also be noted that the mobile deviation system comprises a complex mechanical assembly using springs and articulations which are prone to blockages.

SUMMARY OF THE INVENTION

The object of the present invention is therefore to overcome the disadvantages of the composting toilets of the prior art and to propose a dry-operated composting toilet, capable of keeping up a rapid composting, while ensuring a good visual presentation of the bottom of the toilet.

Another object of the invention is to propose a composting toilet with which a compost of homogeneous quality can be obtained, regardless of the degree of utilisation of the toilet.

A further object of the invention is to propose a composting toilet which is particularly simple, strong and compact.

The objects allocated to the invention are attained with a dry-operated composting toilet, characterized in that:

the tank is mounted so as to be inclined and rotatable about its longitudinal axis of symmetry, which axis forms with the horizontal plane an angle α at least equal to 15°, the tank and the seat being relatively mounted, in such a way that all the vertical generatrices of the discharge hole project into the orifice of the receiving tank.

Various other characteristics will emerge from the description given hereinafter with reference to the accompanying drawings which show, by way of example and non-restrictively, embodiments of the object of the invention.

BRIEF DESCRIPTION OF THE DRAWINGS

FIG. 2 is a cross-sectional view of a composting toilet according to the invention.

FIG. 3 is a front view of an embodiment of a composting toilet according to the invention.

BEST IMPLEMENTATION OF THE INVENTION

Figure 1:
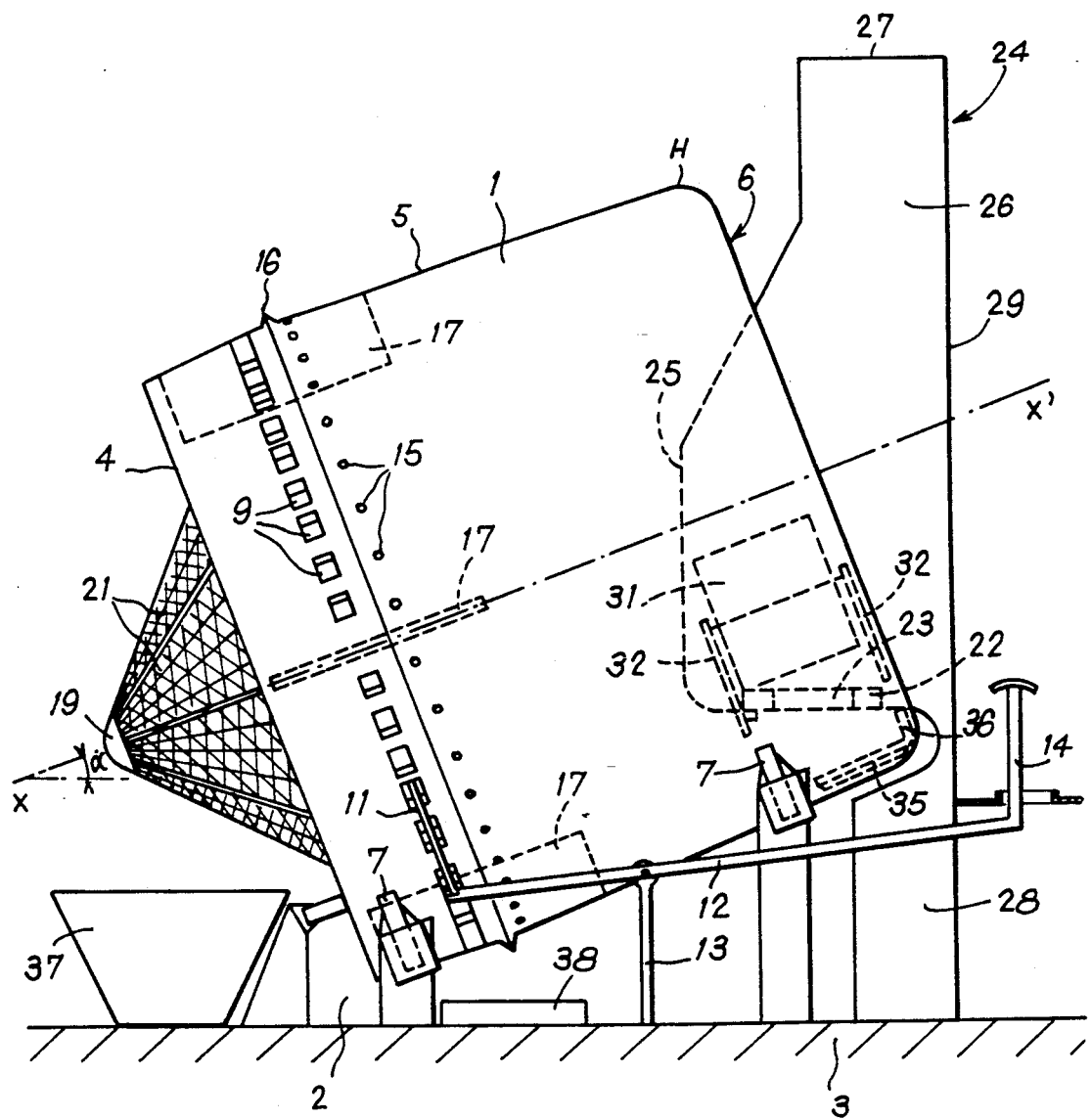
FIG. 1 is a side view showing one example of composting toilet according to the invention.
Figure 4:
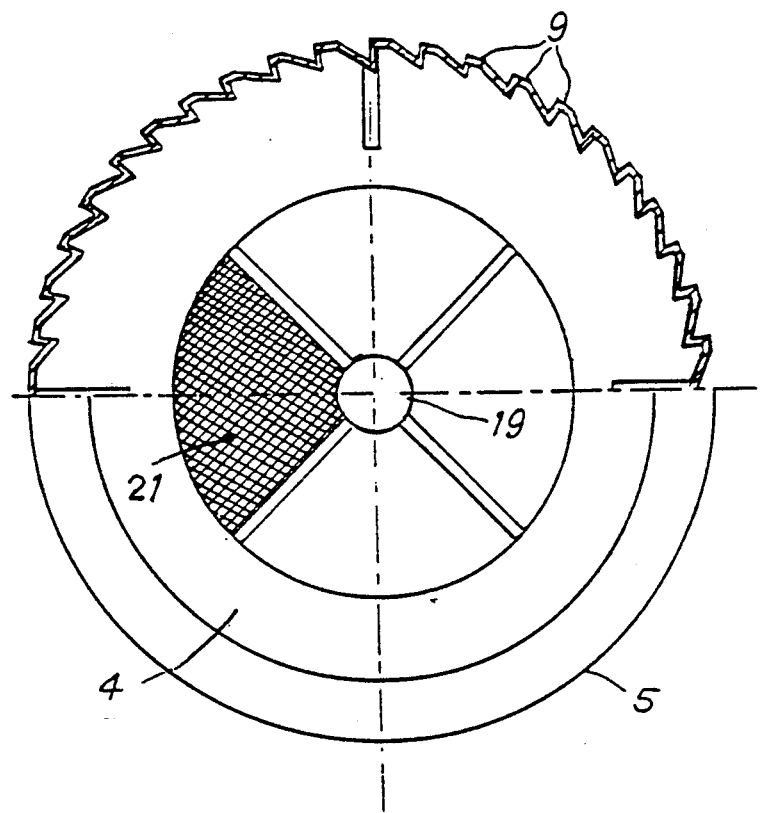
FIG. 4 is a rear view showing one detail of an embodiment of a composting tank according to the invention.

The composting toilet, shown in FIG. 1, comprises a receiving tank 1 forming composting tank resting on a supporting block 2 which rests on the ground 3. In a preferred embodiment of the invention, the receiving tank 1 is like a cylinder comprising a base 4 from which rise walls 5 constituting outer 5a and inner 5b cylindrical peripheral shells. The upper end section of the cylinder, opposite the base 4, is open and constitutes the receiving orifice 6 of tank 1. Preferably also, the walls 5 rise to a constant height above the base 4 and define a cylinder of circular cross-section. The cylindrical tank 1 is mounted for rotating about its longitudinal axis x-x' via rollers or wheels 7 resting on the outer shell of the cylindrical tank 1 and fast with the supporting block 2. The cylindrical tank 1 is also mounted in inclined fashion, such that its longitudinal axis x-x' forms an angle $\alpha$ with the horizontal plane, at least equal to 15° and preferably comprised between 15° and 30°, the inclination being such that the base 4 is situated closer to the ground 3 than the orifice 6, which latter represents the highest part of the cylinder, materialized by the point H.

The tank 1 can be driven in rotation about its longitudinal axis x-x' by a source of electric power, for example connected with the rollers 7, or as illustrated in FIG. 1, by a mechanical device. To this effect, the tank 1 is provided on its periphery with a series of teeth 9 fast with the outer shell 5b of the tank 1, disposed in spaced apart relationship according to a circle coaxial to axis x-x'. The teeth 9 are designed so as to be subjected to the action of an arm 11 which is fast with the end of a lever arm 12 pivotally mounted on a supporting bar 13 resting on the ground. The other end of the lever arm 12 is constituted by an actuating member 14, preferably a pedal. The object of this driving means is therefore to ensure the rotation of the receiving tank 1. Advantageously, the rollers 7 are equipped with a system of the single-steering free-wheel type which allows the rotation of the tank 1 in only one direction.

The tank 1 also comprises a series of perforation 15 formed through the walls 5 of the cylindrical shell 5, close to the base 4 and preferably aligned according to a circle coaxial to axis x-x'. Said perforations are provided as outlets for any liquid phase which may be contained in the tank 1. Perforations 15 can be associated to a peripheral and annular protuberance 16 in one piece with the cylindrical shell, which protuberance is coaxial to axis x-x' and placed between the base 4 and the series of perforations 15. The object of the annular protuberance 16 is to prevent the liquids from running down the outer wall 5b towards the lowest part of the cylindrical tank 1 by channelling the evacuation by gravity of the liquids at the lowest part of said annular protuberance 16.

Advantageously also, the inner wall 5a of the cylindrical shell can be provided with stirring blades 17 spaced out on the inner periphery of the shell and extending radially. Preferably, the receiving tank 1 is equipped with four stirring blades 17 arranged in pairs in diametrically opposite fashion and extending over about one third of the height of the cylindrical tank 1 and situated in the lower part of the cylinder, close to the base 4.

The base 4 is constituted of a circular wall provided with a central recess 18 (FIG. 2), preferably circular to allow emptying of the cylindrical tank 1. Said central recess 18 is covered over with a cone 19 joined to the cylindrical tank 1, coaxial to axis x-x' and provided over all or part of its periphery with a set of sieves 21 constituting the envelope of said cone.

The composting toilet according to the invention is completed by a toilet seat 22 defining a gravity discharge hole 23, which seat is preferably circular or oval, and joined to a cabin 24 including a rear partition wall 25 and two lateral walls 26. Advantageously, the cabin 24 is completed with an upper wall, a base 28 and a front wall 29, so as to constitute a cabin which entirely conceals the user from the outside. The cylindrical tank 1 and the cabin 24 together with the seat 22 are mounted relatively, in such a way that all the vertical generatrices $G_1, G_2 \ldots G_n$ of the discharge hole 23 project inside or in the plane defining the receiving orifice 6 of the cylindrical tank 1. Such an arrangement is of such a type as to allow the direct evacuation by gravity of the excreta and uring present in the cylindrical tank 1, directly onto the inner wall 5b straight above the hole 23. In such a case, the dejections fall directly into the receiving tank 1 and onto the inner wall 5b, inside a zone limited at its upper part corresponding, on the inner wall 5b, to a circular strip defined by the geometrical projections of the generatrices $G_1$ to $G_n$. Advantageously, as illustrated in FIGS. 1 and 2, the seat 22 is disposed inside the volume defined by the cylindrical tank 1, its back resting on the vertical wall 25, which latter extends, at least partly, inside the cylindrical shell 5. Advantageously and with a view to limiting the overall size of the toilet, the seat 22 and the vertical wall 25 are fitted inside the volume defined by the cylindrical tank 1, in such a way that the wall 25 is situated vertically with respect to the highest point H of the tank 1. It is quite obvious that, the greater the angle $\alpha$, the more the vertical which passes through point H projects inside the volume of the tank 1 onto the inner walls 5b and the greater the volume available for inserting the seats 22 in the tank 1.

The composting toilet according to the invention further comprises, advantageously, means for unwinding a strip of paper under the hole 23 and plumb therewith, for permanently giving a good visual presentation of the discharge hole 23 by concealing the inner wall 5b of the cylindrical tank 1, which is led to move under the hole 23. To this effect, the unwinding means can be constituted of a roll of paper 31 held by means of two movable arms 32, fast with a side wall 26 of the cabin 24 or of subsidiary supporting means. The roll 31 is mounted in such a way as to be applied against the inner wall of the tank 1, either by its own weight, or by a subsidiary compression system, such as for example a compression spring. The roll 31 being situated on the side of the hole 23 and resting against the inner wall 5b of the cylindrical tank 1, permits the unwinding of the roll 31 when the cylindrical tank 1 is rotating and ensures the unrolling of the paper strip under the hole 23.

The composting toilet can also be equipped with a device for scraping the portion of inner wall 5b of the cylindrical tank 1 moving under the discharge hole 23. To this end, a scraping blade 35 can be provided, said blade being equipped, at its end for example, with a strip of rubber and being fixed on the end of a bent part 36 joined to a side wall 26 of the cabin 24. The scraping blade 35 is preferentially fixed, with respect to the hole 23, on the opposite side of said hole where the roll of paper is mounted.

The composting toilet is advantageously completed by a receptacle 37 placed under the cone 19, in order to recover the compost produced in the cylindrical tank 1, and by a second receptacle 38 placed just under the orifices 15 and the annular part 16, in order to recover any liquid phase contained in the cylindrical tank 1.

The user, after using the composting toilet, presses down the pedal 14 in order to drive the cylindrical tank 1 in rotation about its axis x-x'. The effect of this rotation is to create, with the gravity, a combination of forces contributing, on the one hand, to helping the excreta and urine to drop down to the lowest part of the cylindrical tank 1, and on the other hand, to ensuring, via the blades 17, a stirring, mixing-up and aeration of the excreta contained in the tank 1, this leading to an accelerated aerobic digestion, hence to an accelerated composting. The dynamical aspect of the rotation of the cylindrical tank 1 further contributes to an efficient separation of the liquid and solid phases contained in the cylindrical tank 1. Moreover, during the rotation of the cylindrical tank 1, a clean portion of paper is unrolled under the hole 23, while the blade 35 resting against the inner wall of the cylindrical tank 1 ensures the cleaning of said inner wall. It should also be noted that the rotatability of the cylindrical tank 1 ensures a good homogenization of the excreta contained in said tank, which makes it possible to obtain a compost of relatively stable and homogeneous quality. It should be further noted that the sifting of the compost through the sieve 21 occurs naturally during the rotation of the cylindrical tank 1, insofar as the lightest particles of the compost, hence the particles in an advanced state of decomposition, float relatively above the mass of the product contained in the tank 1, this leading to a natural and differentiated sifting of the compost.

The composting toilet according to the invention therefore has the advantage of being able to work without any outside water supply and of providing, within a relatively short time, a compost of equally homogeneous quality. The fact that the seat 22 fits inside the cylindrical tank 1 makes it possible to obtain a relatively compact toilet of particularly simple design since there is no need for any subsidiary evacuation device, as the products are discharged by gravity. The selected arrangement actually has the advantage of eliminating the presence of areas or parts which are difficult to clean, since the path between the impact zone and the composting zone is constituted by a simple inclined plane which is regularly cleaned during the rotation of the inclined tank.

The dry-operated composting toilet is not limited to the example of embodiment illustrated in FIGS. 1 to 4 and various variants of embodiment are possible. For example, the cross-section of the cylindrical tank 1 can vary and be oval- or even polygonal-shaped and the receiving orifice 6 can have a cross-section whose surface area is smaller than that of the base 4, in order to reduce the diameter of said orifice. It is also possible, in order to reduce the risks of bad smells, to equip the cabin 24 with a circular skirt, adaptable, to within the rotation clearance, on the periphery of the cylindrical tank 1, in order to produce a covering to improve the hermetism of the cylindrical tank 1.

POSSIBLE INDUSTRIAL APPLICATION:

The invention finds a particularly advantageous application in dry-operated composting toilets.

The invention is not limited to the examples described and illustrated herein, and various modifications can be brought thereto without departing from its scope.

I claim:

1. Dry-operated composting toilet comprising a substantially horizontal toilet seat (22) connected with a gravity discharge hole (23) which extends vertically, a receiving tank (1) having an associated longitudinal axis (x-x') forming an angle ($\alpha$) with respect to a horizontal plane, said tank (1) having a receiving orifice (6) which extends at least partly under the seat (22), means for rotatably mounting the tank (1) so that the tank (1) is inclined and rotatable about its longitudinal axis of symmetry (x-x'), which axis forms with the horizontal plane an angle ($\alpha$) at least equal to 15°, the tank (1) and the seat (22) being relatively mounted in such a way that the entire discharge hole (23) is positioned directly, vertically above the receiving orifice (6) of the tank (1).

2. Toilet according to claim 1, wherein the tank is composed of a base (4), from which rise walls (5) for constituting a shell having an upper section that is open and defines the receiving orifice (6).

3. Toilet according to claim 2, wherein the seat (22) is fitted, via walls (25, 26) inside the shell and rests against a vertical partition wall (25) which extends, at least partly, inside said shell.

4. Toilet according to claim 2, wherein the tank (1) comprises a cylinder of circular cross-section, the seat (22) being attached to a vertical partition wall (25) that extends into said cylinder.

5. Toilet according to claim 4, wherein the tank (1) is inclined at an angle ($\alpha$) which is between 15° and 30°.

6. Toilet according to claim 2, wherein the walls (5) of the tank (1) comprise a series of peripheral perforations (15), disposed close to the base (4) for evacuating liquid from the tank (1).

7. Toilet according to claim 2, wherein the tank (1) further comprises, on its base (4), means for sifting a compost constituted by a cone (19) coaxial to the tank, said cone being defined by walls that are equipped with a sieve (21).

8. Toilet according to claim 1, wherein the tank (1) includes an inner wall (b) that is provided with blades (17) for mixing and stirring a compost.

9. Toilet according to claim 1, further comprising a device (31, 32) for unwinding a strip of paper under the opening (23), which device comprises a winding roll (31), permanently applied against inner walls of the tank (1) via two movable arms (32) fast with walls (26) in which the seat (22) is fitted.

10. Toilet according to claim 1, further comprising means (35) for scraping inner walls (5b) of the tank, which means are permanently applied against said inner walls and fixed on walls (26) in which the seat (22) is fitted.

* * * * *